United States Patent [19]

Bois

[11] Patent Number: 5,893,319
[45] Date of Patent: Apr. 13, 1999

[54] APPLIANCE FOR HEATING FOODSTUFFS WITH STEAM

[75] Inventor: Bernard Bois, Caen, France

[73] Assignee: Moulinex S.A., Paris, France

[21] Appl. No.: 09/022,675

[22] Filed: Feb. 12, 1998

[30] Foreign Application Priority Data

Feb. 12, 1997 [FR] France ................... 97 01625

[51] Int. Cl.⁶ ................................................. A47J 27/04
[52] U.S. Cl. .......................... 99/410; 99/413; 99/417; 99/446; 99/450; 126/369
[58] Field of Search .................. 99/403, 410–417, 99/444–446, 400, 468, 401, 474, 450, 473, 330, 331; 126/369, 369.2, 20; 219/401, 415, 442; 426/418, 509–511, 523

[56] References Cited

U.S. PATENT DOCUMENTS

| | | | |
|---|---|---|---|
| 3,908,111 | 9/1975 | Du Bois et al. | 219/442 |
| 4,148,250 | 4/1979 | Miki et al. | 99/403 |
| 4,426,923 | 1/1984 | Ohata | 99/468 |
| 4,672,179 | 6/1987 | Onishi et al. | 99/403 X |
| 4,739,698 | 4/1988 | Allaire | 99/410 |
| 4,982,656 | 1/1991 | Stone | 99/450 X |
| 5,092,229 | 3/1992 | Chen | 99/413 X |
| 5,189,947 | 3/1993 | Yim | 99/415 |
| 5,400,701 | 3/1995 | Sham | 99/410 |

*Primary Examiner*—Timothy F. Simone
*Attorney, Agent, or Firm*—Young & Thompson

[57] ABSTRACT

A kitchen appliance for heating foodstuffs with steam, comprising, in a housing (1) having a bottom (2) and a side wall (3), a cold water reservoir (4) supplying a chamber for the production of steam (5), supplying itself through a steam inlet (6), a cooking chamber (7) disposed on the housing (1) and adapted to receive foodstuffs. The housing (1) has in its side wall (3) a channel (8) communicating with the exterior of the housing (1) through a filling cover (12) and with the interior of the housing (1) through a flow opening emptying into the cold water reservoir (4).

4 Claims, 1 Drawing Sheet

APPLIANCE FOR HEATING FOODSTUFFS WITH STEAM

CROSS REFERENCE TO RELATED APPLICATION

This application corresponds to French application 97/01625 of Feb. 12, 1997, the disclosure of which is incorporated herein by reference.

FIELD OF THE INVENTION

The present invention relates to an appliance for heating foodstuffs with steam comprising, in a housing having a bottom and a side wall, a cold water reservoir supplying a steam production chamber which in turn supplies, via a steam inlet, a cooking chamber disposed on the housing and adapted to receive foodstuffs.

BACKGROUND OF THE INVENTION

In appliances of this nature, the cold water reservoir is generally arranged within the housing to obtain reduced size. However, in use, it is apparent that this type of appliance is inconvenient to use, particularly on the one hand when it is disposed on a very narrow working surface and, on the other hand, when the user has already placed the cooking chamber full of food on the housing before filling the reservoir with cold water. Thus, the operation of filling with water requires a certain skill on the part of the user because he must systematically withdraw the cooking chamber from the housing to have access to the cold water reservoir. This operation of filling thus requires careful attention of the user and greatly increases the period of time before starting the operation of the appliance. On the other hand, in the course of cooking, it requires great care and is dangerous to add water to prolong the production of steam.

SUMMARY OF THE INVENTION

The object of the invention is thus to overcome these drawbacks by providing an appliance for heating food with steam which, whilst maintaining simplicity and compactness of construction, improves the convenience and safety of such apparatus.

According to the invention, the housing has in its side wall a channel communicating with the exterior of the housing through a filling opening and with the interior of the housing through a pouring opening emptying into the cold water reservoir.

Thus, thanks to the appliance according to the invention, the cold water reservoir is directly accessible without withdrawing the heating chamber and hence offers great convenience of filling.

According to another characteristic of the invention, the channel comprises a transparent window visible from outside through an opening provided in the housing. This window thus ensures perfect visibility, on the one hand, of the water level reached in the course of the filling operation and, on the other hand, of the water level remaining during or after operation of said appliance.

Moreover, thanks to this window, it is not necessary to use a water level tube connected to the cold water reservoir and disposed parallel to the side wall of the housing. The new arrangement according to the invention thus contributes to decreasing the cost of an appliance for heating foodstuffs with steam provided with a display device of the water level of the cold water reservoir.

BRIEF DESCRIPTION OF THE DRAWINGS

Other characteristics and advantages of the invention will become apparent from the description which follows, given by way of non-limiting example, with reference to the accompanying drawing, in which.

DETAILED DESCRIPTION OF THE INVENTION

Figure 1:
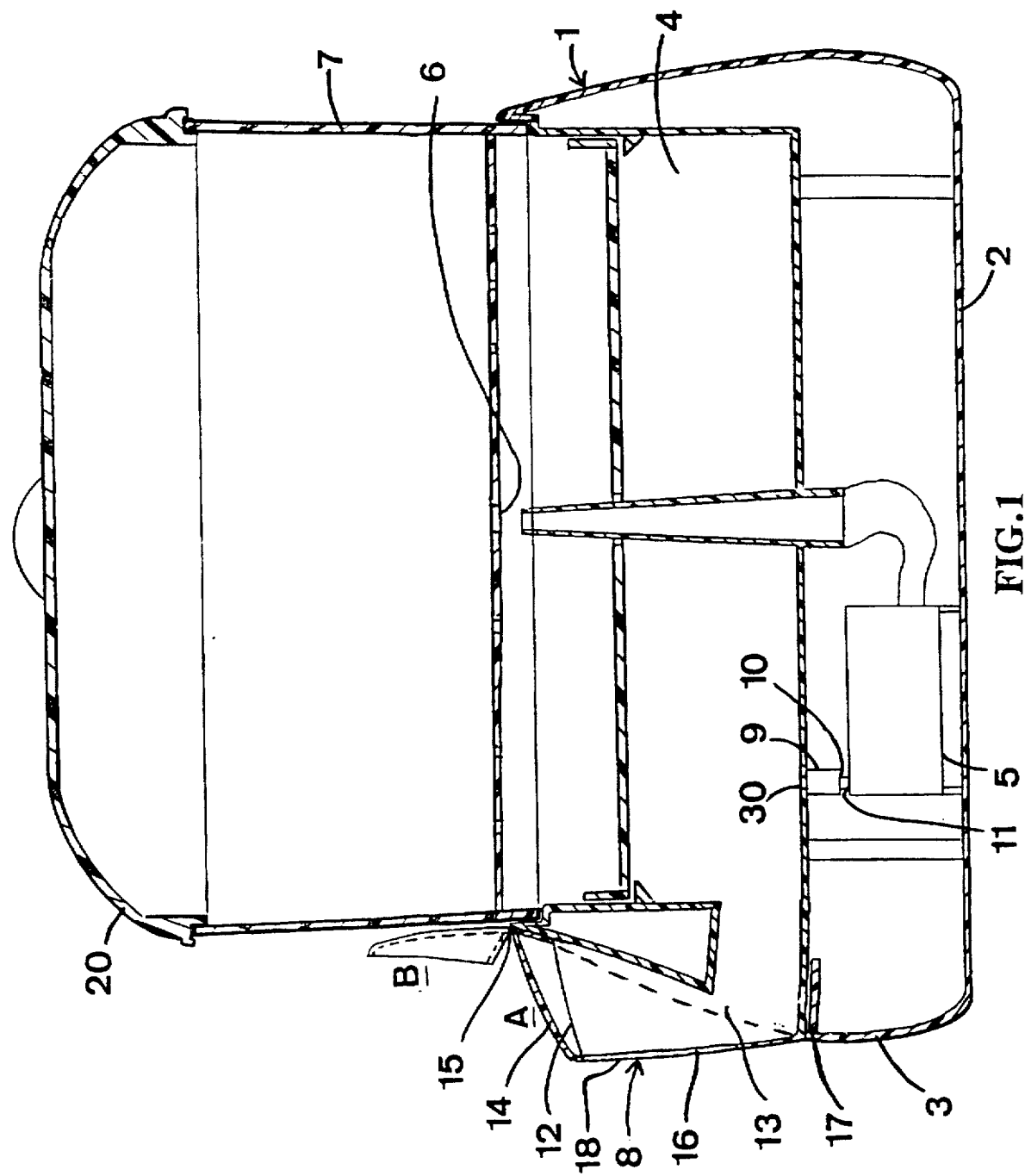
FIG. 1 is a vertical cross-sectional view of an appliance for heating foodstuffs with steam, according to the invention.

The appliance for heating foodstuffs with steam, shown in the drawing, comprises, in a housing 1 having a bottom 2 and a side wall 3, a cold water reservoir 4 supplying a steam production chamber 5 in communication with said cold water reservoir and itself supplying, by a steam inlet 6, a cooking chamber 7 adapted to receive foodstuffs (not shown) enclosed generally by a cover 20.

The bottom of the cold water reservoir 4 has a flow opening 30 connected to a supply chamber 9 whose outlet 10 is connected to an inlet 11 of the steam production chamber 5.

The housing 1 in horizontal cross section has substantially an ovoidal shape.

According to the invention, the housing has in its side wall 3 a channel 8 communicating with the exterior of the housing through a filling opening 12 and with the interior of the housing by a flow opening 13 emptying into the cold water reservoir 4.

In the illustrated embodiment, the channel 8 is provided in the front side wall 3 of the housing 1 so as to provide a compact and ergonometric arrangement of said appliance.

The channel 8 comprises moreover a cover 14 mounted pivotally on the housing 1 about a horizontal axle 15 and adapted to occupy two positions, a first position A in which the filling opening 12 is closed and a second position B shown in broken lines in the drawing and in which the filling opening 12 is open. Such a cover 12 prevents dust from entering via the channel 8 into the interior of cold water reservoir 4.

According to another characteristic of the invention, the channel 8 comprises a transparent window 16 visible from outside through an opening 17 provided in the housing 1. In a preferred embodiment, the window 16 of the channel 8 is made of a transparent plastic material and has in longitudinal cross section the general shape of a crescent. The transparent window 16 has a bulge 18 which causes the opening 17 to protrude from the housing 1. Thus, only the bulge 18 projects from the front side wall 3 of the housing 1.

It will be understood that the kitchen appliance thus constituted is for easy use by an operator. Thus, during a filling operation of the water reservoir, the user pivots the cover 14 to the position B. This position exposes the section of the filling opening 12 of the channel 8. The user then rapidly pours water through said filling opening 12 and watches the appearance directly, through the window 16, of the contents of the cold water reservoir 4 during filling. When the filling operation is completed, the user closes the cover 14. Then the user positions the foodstuffs within the cooking chamber 7, closes said cooking chamber 7 with the cover 20, and makes sure that the cooking chamber 7 is well proportioned within the housing 1. The user then need only rapidly oversee the content of the cold water reservoir 4 in the course of or after a cooking operation, thanks to the transparent window 16 of the channel 8.

What is claimed is:

1. A kitchen appliance for heating foodstuffs with steam, comprising:

a housing having a bottom and an external side wall;

a cold water reservoir disposed in said housing and including means for supplying cold water to a steam production chamber;

a cooking chamber disposed on said housing and adapted to receive foodstuffs, said cooking chamber having a steam inlet structured and arranged to receive steam from the steam production chamber;

a channel disposed in the external side wall of the housing, said channel having a water filling opening communicating with the exterior of the housing, and a water flow opening communicating with the interior of the housing and emerging into the cold water reservoir.

2. The kitchen appliance according to claim 1, wherein the channel has a transparent window visible from outside through an opening provided in the external side wall of the housing.

3. The kitchen appliance according to claim 2, wherein the window has a bulge comprising a projection of the opening in the external side wall of the housing.

4. The kitchen appliance according to claim 1, wherein the channel has a cover mounted on the housing about a horizontal axis and adapted to occupy two positions, namely:

a first position in which the filling opening is closed, and a second position in which the filling opening is open.

* * * * *